(12) United States Patent
Yin

(10) Patent No.: US 10,505,793 B2
(45) Date of Patent: Dec. 10, 2019

(54) NETWORK APPLIANCE HEALTH MONITOR

(71) Applicant: Fortinet, Inc., Sunnyvale, CA (US)

(72) Inventor: Jun Yin, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 506 days.

(21) Appl. No.: 15/083,409

(22) Filed: Mar. 29, 2016

(65) Prior Publication Data

US 2017/0288955 A1 Oct. 5, 2017

(51) Int. Cl.
*G06F 15/173* (2006.01)
*H04L 12/24* (2006.01)
*H04L 12/26* (2006.01)
*H04L 29/06* (2006.01)

(52) U.S. Cl.
CPC .......... *H04L 41/0695* (2013.01); *H04L 43/08* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,728,748 B1* | 4/2004 | Mangipudi | H04L 41/5009 709/226 |
| 2011/0035535 A1* | 2/2011 | Locasio | G11C 16/349 711/103 |
| 2016/0072834 A1* | 3/2016 | Bott | H04L 63/1425 726/1 |
| 2016/0266953 A1* | 9/2016 | Spitzer | G06F 11/079 |
| 2016/0299933 A1* | 10/2016 | Fillipi | G06F 17/30362 |
| 2017/0235622 A1* | 8/2017 | Boyapalle | G06F 11/3055 714/47.2 |

* cited by examiner

*Primary Examiner* — Umar Cheema
*Assistant Examiner* — Anthony T Rotolo
(74) *Attorney, Agent, or Firm* — Jaffery Watson Mendonsa & Hamilton, LLP

(57) ABSTRACT

Systems and methods for monitoring failures of network devices and identifying potential sources of the failures by a device health monitor are provided. A device monitor receives a usage log of a network device over a network connection and analyzes an abnormal usage of the network device from the usage log. The device health monitor further retrieves environment information of the network device and analyzes a defect of the environment information of the network device by associating the abnormal usage with the environment information. The device health monitor sends a message regarding the defect of the environment information to an administrator of the network device.

18 Claims, 6 Drawing Sheets

NETWORK APPLIANCE HEALTH MONITOR

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of computer networking and network security. In particular, various embodiments relate to monitoring failures of network devices and finding sources of the failures.

Description of the Related Art

Network security appliances, such as firewalls, are widely deployed within private networks and public networks. Security policies may be configured at network security appliances for controlling network traffic going through the networks. Network traffic may be allowed, blocked or logged by the network security appliances based on the security policies. Other network security services, such as anti-spam, antivirus, data leak prevention, intrusion prevention and etc., may also be provided by network security appliances. Most of the network security appliances require continuous (24×7) availability. It is critical to maintain the health of the network security appliances. However, network security appliances themselves are subject to hardware and software failures. To monitor hardware failures, sensors may be incorporated within a network appliance to collect information regarding the status of hardware of the network appliance. A remote monitor system may be deployed to monitor hardware failure information collected by the sensors of the network appliance. When a hardware failure occurs, the remote monitor system may send out a warning message to the administrator of the network appliance notifying the administrator of same. Similarly, software failures, such as system crashes or application crashes can be recorded by the network appliance within a system log and sent to the remote monitor system.

Sometimes, a hardware failure of a network security appliance is not due to quality issues relating to the hardware. Rather, a hardware failure may arise as a result of a software defect. For example, a hard disk or a solid state disk (SSD) of a network security appliance may wear out quickly because of log writing occurring too frequently as a result of a misconfiguration of a security policy at the network security appliance. When a remote monitor system identifies the wear-out or failure of the disk of the network security appliance, it is not very helpful if the remote monitor system simply notifies the administrator of the occurrence of disk wear-out/failure without identifying the underlying source of the problem.

A remote monitor system may also monitor a large number of network security appliances of a private network. Software environments of all network security appliances may be changed by the administrator of the private network. For example, the administrator may add a network security policy to all of the network security appliance or update the operating systems of the network security appliances to a new version. If the new security policy or new version of operating system has a defect that may cause a hardware or software failure, it may be a failure common to all or many of the network security appliances of the private network. It would be very helpful if the remote monitor system could identify common problems of the network security appliances as well as the source of such common problems.

SUMMARY

Systems and methods are described for monitoring failures of network devices and identifying potential sources of the failures by a device health monitor. According to one embodiment, a device monitor receives a usage log of a network device over a network connection and analyzes an abnormal usage of the network device from the usage log. The device health monitor further retrieves environment information of the network device and analyzes a defect of the environment information of the network device by associating the abnormal usage with the environment information. The device health monitor sends a message regarding the defect of the environment information to an administrator of the network device.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
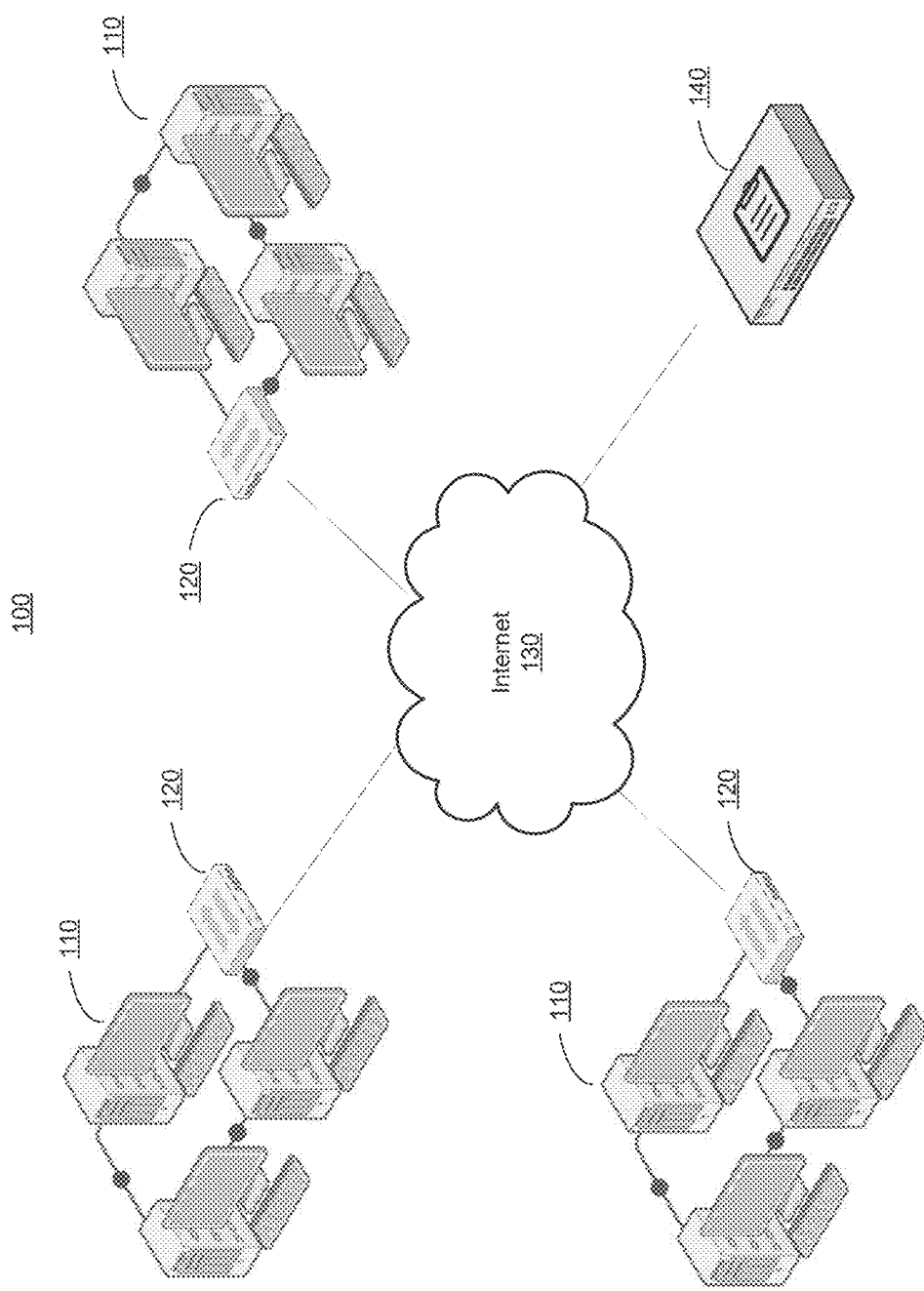
FIG. 1 illustrates exemplary network architecture in accordance with an embodiment of the present invention.

Systems and methods are described for monitoring failures of network devices and identifying potential sources of the failures by a device health monitor. According to another embodiment, a device monitor receives a usage log of a network device over a network connection and analyzes an abnormal usage of the network device from the usage log. The device health monitor further retrieves environment information of the network device and analyzes a defect of the environment information of the network device by associating the abnormal usage with the environment information. The device health monitor sends a message regarding the defect of the environment information to an administrator of the network device.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, Virtual Private Networking (VPN), antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, VPN, IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture in accordance with an embodiment of the present invention. The network architecture 100 shown in FIG. 1 includes multiple private networks 110 which are connected by a public network, such as the Internet 130. Each of private networks 110 may include multiple network appliances, such as local server, local PC, local laptop, local mobile phone and other computing devices that are operatively coupled to each other through a Local Area Network (LAN), wherein the LAN is then operatively coupled with a network security appliance 120 which enable the access to Internet 130.

Network security appliance 120 is deployed at the border of private network 110 and is used for separating the external computing environment, represented by Internet 130, from the internal computing environment of private network 110. Network security appliance 120 may intercept communications between Internet 130 and the network appliances of private network 110 and may, among other things, scan for malware, viruses or high risk network accesses. Network security appliance 120 may maintain one or more logs to record hardware and software status information that are collected by physical sensors or system monitoring processes running within network security appliance 120. Exemplary structure and functionality of network security appliance 120 is described in further detail below with reference to FIG. 2.

In the present example, a device health monitor 140 may connect to each of network security appliance 120 through a network connection, such as a VPN connection, and collect the log data of network security appliance 120 periodically or in real time. After the log data is collected from network security appliance 120, device health monitor 140 may analyze a failure or abnormal usage of a hardware or software resource of network security appliance 120. Device health monitor 140 may check software environment information of the network device and determine the source of the failure or abnormal usage by associating the failure or abnormal usage with an environment configuration of the network device. Exemplary structure and functionality of device health monitor 140 is described in further detail below with reference to FIG. 3.

Figure 2:
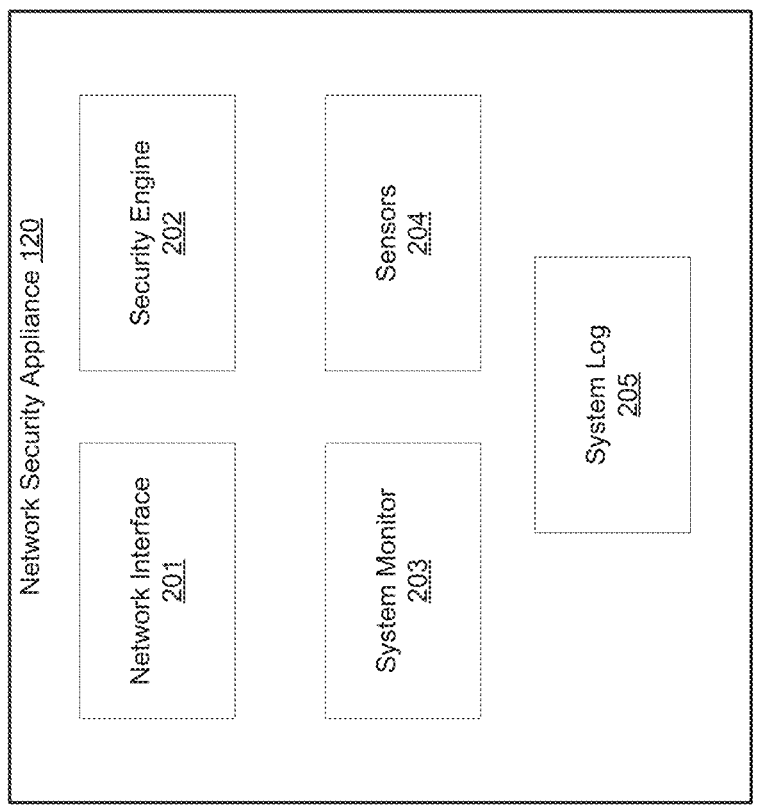
FIG. 2 illustrates exemplary functional units of a network appliance in accordance with an embodiment of the present invention.

FIG. 2 illustrates exemplary functional units of a network appliance 120 in accordance with an embodiment of the present invention. In the present example, network security appliance 120 comprises a network interface 201, a security engine 202, a system monitor 203, sensors 204 and a system log 205.

Network interface 201 may include, but is not limited to, an internal interface with 4-24 or more Ethernet ports, 1-4 or more wide area network (WAN) interfaces and one demilitarized zone (DMZ) interface.

Security engine 202 is used for controlling network traffic going through network interface 201 based on security policies configured by the administrator of the network. An action, such as allow, deny or deep scanning, may be taken on the network traffic when the traffic triggers a security policy. Security engine 202 may also provide other security services, such as VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution.

System monitor 203 is used for collecting runtime status information relating to network security appliance 120. The runtime status information may include operations, states and events of hardware and software resources of network security appliance 120. Some runtime status information of hardware components of network security appliance 120 may be collected by sensors 204 that are mounted within network security appliance 120. For example, one or more temperature sensors may be mounted adjacent to heat sources, such as a central processing unit (CPU) and a power supply, to collect the temperatures of these components at runtime. Some runtime status information of hardware components may be collected by a monitoring program of the operating system running on network security appliance 120. For example, a wear-out counter that tracks the usage of a solid state disk (SSD) may be retrieved from the driver program of the SSD by system monitor 203 on the fly. Software runtime status information may also be collected by the monitoring program of the operating system running on network security appliance 120. The operating system may maintain system logs that record the usage of system resources, such as memories, CPUs and network interfaces. Abnormalities, e.g., daemon crashes, kernel crashes and memory leaks, may also be recorded to the system logs.

All hardware and software runtime status information of network security appliance 120 may be stored within system log 205. The hardware and software runtime status information may be transferred to device health monitor 140 on the fly or periodically over a network connection that is established between network security appliance 120 and device health monitor 140. Those skilled in the art will appreciate that any changes to the software and hardware environments or configurations of network security appliance 120, including, but not limited to, updates to the network operating system and network security policies, may also be logged by system monitor 203 and be transferred to network appliance health monitor 140.

Figure 3:
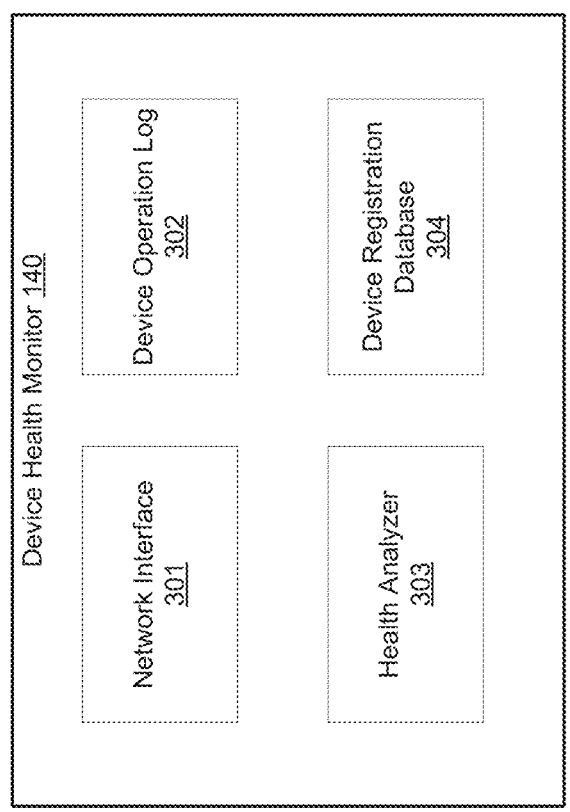
FIG. 3 illustrates exemplary functional units of a network appliance health monitor in accordance with an embodiment of the present invention.

FIG. 3 illustrates exemplary functional units of a network appliance health monitor 140 in accordance with an embodiment of the present invention. In the present example, network appliance health monitor 140 is used for remotely monitoring the health of network appliances by identifying abnormal usage or failures based on runtime status information collected from one or more network security appliances. Network appliance health monitor 140 may further determine software or hardware configurations of the monitored network appliance that may be causing or contributing to the abnormal usage or failure. In one example, network appliance health monitor 140 may collect runtime status information from multiple network security appliances deployed within a private network. These network security appliances may run the same network operating system and be configured with the same or similar security policies that control the network activities within the private network. If a defect exists in the network operating system or the network security policies, it may cause common abnormal usage issues or hardware or software failures within the multiple network security appliances of the private network. Network appliance health monitor 140 may detect such a common abnormal usage or failure among the multiple network security appliances and track a cause of the common failure to the common hardware or software configuration of the network security appliances. In another example, network appliance health monitor 140 may collect runtime status information from multiple network security appliances from the same manufacturer. These network security appliances may have the same hardware configuration and the same network operating system but may be used in different network environments by different users. These network security appliances may be monitored by a cloud-based network device health monitor 140. Network appliance health monitor 140 may detect a common failure of the multiple network security appliances from the same manufacturer and track the cause of the failure to the common hardware or software configurations of the network security appliances.

Network appliance health monitor 140 of the present example comprises a network interface 301, a device log 302, a health analyzer 303 and a registered device database 304. Network interface 301 is used for establishing a network connection with a network appliance, such as network security appliance 120. The network connection may be a VPN connection if the connection is through an intervening public network. Runtime status information of network appliances that are monitored by network appliance health monitor 140 is received by network interface 301 and stored at device operation log 302. Device registration database 304 is a database that records information regarding the hardware and/or software environments of registered devices that are monitored by network appliance health monitor 140. For example, when a network security appliance is deployed within a private network, it may register with network appliance health monitor 140 and send its hardware and software configuration information to network appliance health monitor 140. The hardware configuration information of the network security information may include, but is not limited to, model numbers, serial numbers, and manufacturers of critical parts (e.g., CPU, hard drive, memory, mother board and power supply). Software configuration information may include the version of the network operating system, information regarding network security services running on the network operating system and security policies of the network security appliance. When the hardware or software configurations of network security appliance are updated or upgraded, for example, when the network operating system of the network security appliance is upgraded to a new version or some security policies have been changed by the administrator of the private network, the changes in hardware or software configurations may also be received and stored by network appliance health monitor 140. It will be apparent to one skilled in the art that the configuration information or update information of network security appliances may be collected by a controller device or cloud that is managing the network security appliances. The configuration information or update information of the network security appliances may be transmitted to network appliance health monitor 140 by the controller device or cloud. It will also be appreciated by those skilled in the art that device registration database 304 may be a database associated with the controller device or cloud that can be accessed remotely by network appliance health monitor 140.

Health analyzer 303 is used for analyzing an abnormal usage issue or failure from the runtime status information of a network security appliance and identifying a cause of the abnormal usage issue or failure from configuration information of the network security appliance. In one example, health analyzer 303 may calculate a wear-out counter of an SSD of a network security appliance. If the increasing speed of the wear-out counter exceeds a threshold or continuously exceeds a threshold within a specified timeframe, health analyzer 303 may determine that an abnormal usage of the SSD occurred. Similarly, health analyzer 303 may monitor the temperatures, fan speeds, CPU usage and network interface usage of the network security appliance and determine whether an abnormal usage or failure of a critical part of the network security appliance has occurred. In another example, abnormal usages or failures of a network security appliance are detected and logged by the network security appliance itself. For example, when software failures, including, but not limited to, daemon crashes, a kernel crash, memory leaks and conserve modes, occur within a network security appliance, corresponding information about the software failures may be stored within system logs by the operating system of the network security appliance. The system logs of the network security appliance may be sent to network appliance health monitor 140. Health analyzer 303 may extract information regarding the failures directly from the system logs.

When an abnormal usage or failure is detected, health analyzer 303 further detects a cause or possible cause that contributes to or causes the abnormal usage or failure by evaluating/analyzing the configuration information of the network security appliance. For example, if a disk is written too often as indicated by the wear-out counter, health analyzer 303 may further analyze the logging operations contained in security policies of the network security appliance. If a security policy triggers logging operations at network traffic from any source to any destination, it is highly likely that this security policy may result in too many disk write operations. Health analyzer 303 may associate this and other kinds of network security policies with the detected abnormal usage or failure and notify the administrator of the abnormal usage or failure and the possible sources thereof. In another example, health analyzer 303 may analyze changes to configuration information of the network security appliance and associates a change of configuration information of the network security appliance with the abnormal usage or failure. For example, when an abnormal CPU temperature of the network security appliance is detected by health analyzer 303, health analyzer 303 may further determine that the abnormal CPU temperature occurred after (e.g., within a predetermined or configurable timeframe of) an upgrade of the network security appliance's network operating system from an old version (e.g., v1.0.1) to a new version (e.g., v1.0.2). Then, health analyzer 303 may associate the abnormal CPU temperature with the upgrade of the network operating system and notify the administrator of the abnormal CPU temperature and associated version (e.g., v1.0.2) of the network operating system. In a further example, responsive to detection of an abnormal disk writing issue within the network security appliance by health analyzer 303, health analyzer 303 may further determine that the abnormal usage occurred after (e.g., within a predetermined or configurable timeframe of) one or more security policies being revised. Then, health analyzer 303 may associate the abnormal usage of the disk with the revised security policies and notify the administrator of the abnormal usage and associated revised security policies. The administrator may then check the logging operations included in the associated network security policies to confirm whether the cause of the defect exists within the security policies.

In another example, health analyzer 303 may also determine whether the abnormal usage or failure is a common problem among multiple network security appliances and identify the cause of the common problem based on configuration information of the multiple network security appliances. When health analyzer 303 detects a problem has occurred within a network security appliance, health analyzer 303 may further check whether the same problem has occurred within other network security appliances. If it is a common problem among multiple network security appliances, health analyzer 303 may determine whether the multiple network security appliance have a common configuration and, if so, identify the common configuration as the cause of the problem. In one example, when a common hardware problem, such as an abnormal wear-out of SSD, is detected within multiple network appliances of the same private network, health analyzer 303 may further determine whether the same security policies or services were incorporated within the multiple network security appliances by the administrator of the private network before the abnormal writing of SSD occurred. If so, health analyzer 303 may associate the newly incorporated security policies or services with the abnormal wear-out of SSD. Health analyzer 303 may report the abnormal wear-out of SSD as well as the possible cause of problem to the administrator of the private network. The administrator may check the security policies or services to solve SSD wear-out problem. In another example, health analyzer 303 may check if the network security appliances suffering from the common problem have the same software configurations, e.g., the same version of network operating system, the same upgrade of network operating system or the same network security services. In such a case, health analyzer 303 may identify the common software configuration as a potential cause of the common hardware problem.

Figure 4A:
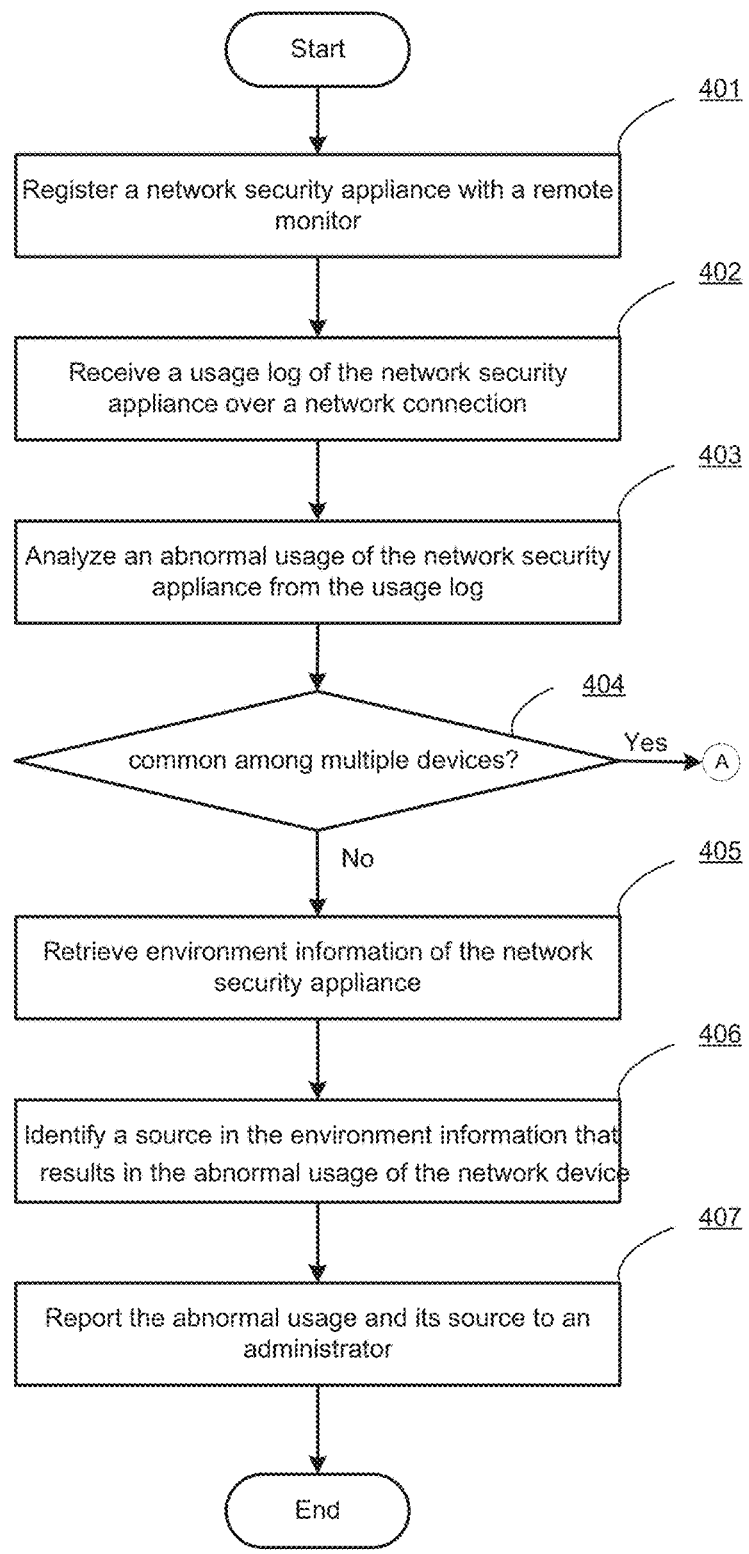
FIGS. 4A and 4B together represent a flow diagram illustrating a method for remotely monitoring the health of a network appliance in accordance with an embodiment of the present invention.
Figure 4B:
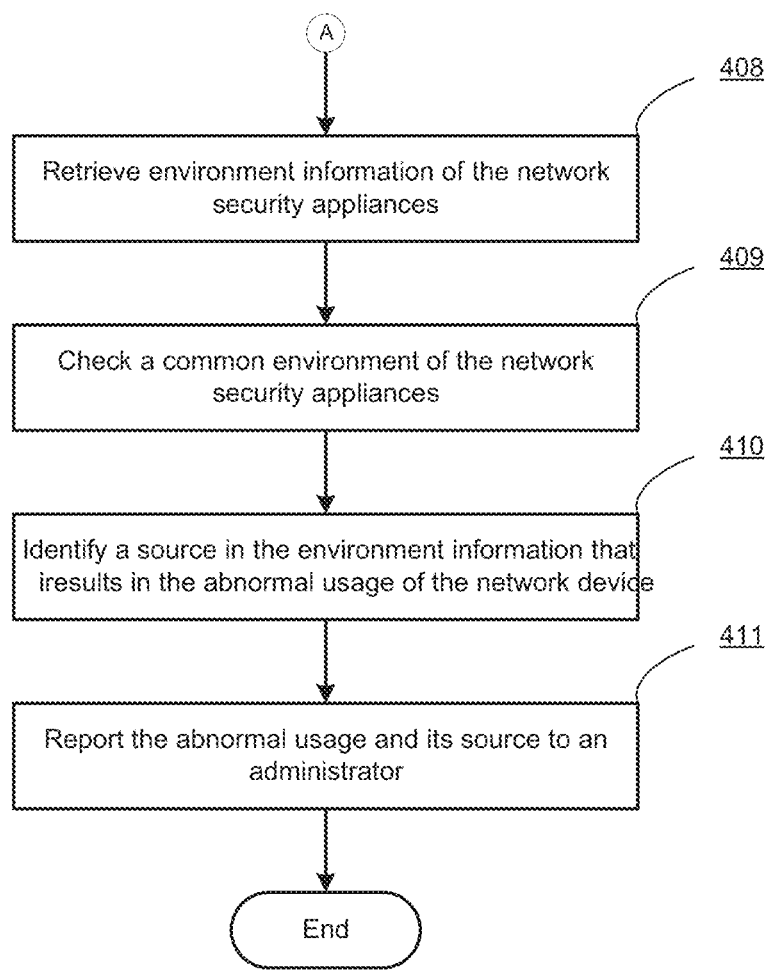

FIGS. 4A and 4B together represent a flow diagram illustrating a method for remotely monitoring the health of a network appliance in accordance with an embodiment of the present invention. The method of the present example may be implemented by device health monitor 140 of FIGS. 1 and 3.

At block 401, a device health monitor receives registration information from network security appliances. In one example, the device health monitor may be a controller device, e.g., a FortiManager, FortiAnalyzer, FortiSIEM or FortiController manufactured by the assignee of the present invention, that control the registration, administration, configuration and running of other networking devices. The network security appliances, e.g., FortiGate, FortiAP, FortiWiFi, FortiSwitch, FortiWeb, and FortiDB, may be devices that provide networking, web applications and security services. The device health monitor and network security appliances may be connected to a private network through a local Area Network (LAN) or a wide area network (WAN). When a network security appliance is connected to the private network, the network security appliance may register with the device health monitor. The hardware and software environment information of the network security appliance may be sent to the device health monitor during the registration. Further, when the hardware and software environments/configurations of the network security appliance are changed, such as updates of network operating system or network security policies, the changes of hardware and software environment information may also be sent to the device health monitor.

The device health monitor may collect registration information, hardware and software configurations and other update information relating to the network security appliances of the private network and store the information within a device database. In another example, the device health monitor may be implemented as a cloud-based service that collects hardware and software environment information of network security appliances from one or more manufacturers and potentially deployed in different enterprise networks over the Internet. As such, the network security appliances may be deployed within different private networks but may be managed by the device health monitor from the cloud.

At block 402, the device health monitor receives a usage log of the network security appliance. The usage log may include the operation information of the hardware and software of network security appliance. For example, writing counts of SSDs, temperatures and usages of CPUs and network traffic of network interfaces may be collected by network security appliance in real time and stored within one or more usage logs. The usage log of the network security appliance may be sent to the device health monitor in real time or periodically.

At block 403, the device health monitor may analyze the usage log of the network security appliance to determine whether an abnormal usage of hardware or software resources of the network security appliance has occurred. For example, when a writing count of an SSD of the network security appliance exceeds a threshold or repeatedly exceeds a threshold within a particular timeframe, then the device health monitor may determine that the SSD is in imminent danger of wearing out. Similarly, the device health monitor may identify, among other things, excessive duration of high-CPU usage, high kernel CPU usage and/or high network usage of the network security appliance. It will be apparent, however, to one skilled in the art that the abnormal usage of hardware or software resources of the network security appliance may be included in the usage log received by the device health monitor. For example, a hard drive or SSD of the network security appliance may periodically monitor and record various parameters of the drive's technical condition and provide it in relative numbers indicative of wear-out. As soon as the values of the parameters at issue fall below a critical level, the drive may be considered unreliable. The wear-out information provided by the drive may be collected and stored at the usage log of the network security appliance and submitted to the device health monitor. The device health monitor may get the wear-out counter directly from the usage log instead of calculating the wear-out counter by device health monitor itself. Similarly, some abnormal usages of the hardware and software resources the network security appliance may also be detected by the network security appliance and stored within the usage log. The device health monitor may extract the abnormal usages, such as daemon crashes, kernel crashes, memory leaks, and memory usage in conserve mode, from the usage log of the network security appliance.

At block 404, the device health monitor may determine if the abnormal usage of the network security appliance is a common problem among other network security appliances that are monitored/managed by the device health monitor. In one example, the device health monitor may check usage logs of other network security appliances belonging to the same private network as that of the network security appliance and determine whether such other network security appliances have the same abnormal usage issue. In another example, the device health monitor may check other network security appliances having the same manufacturer as the network security appliance at issue to evaluate whether the abnormal usage issue is a common problem. If the abnormal usage is not a common problem among multiple network security appliances, then the process continues with block 405.

At block 405, the device health monitor may retrieve the registered environment information of the network security appliance from a device database. The environment information may include the hardware and software configuration information, including, but not limited to, models of memory, network processors, content processors and CPUs, versions of the network operating system running on the network security appliance and the current network security policies of the network security appliance.

At block 406, the device health monitor attempts to identify a potential cause of the abnormal usage from the environment information of the network security appliance. In particular, the device health monitor may associate a defect in the software configuration of the network security appliance with an occurrence of hardware abnormal usage by the network security appliance. For example, when an SSD wear-out problem is detected, the device health monitor may analyze network security policies of the network security appliance to identify those that may result in a large number of disk operations. For example, security policies that log network traffic between any source IP address and any destination IP address are likely to result in a large number of disk write operations. Security policies that log the entirety of data packets instead of simply headers of data packets may also result in excessive disk write operations. The device health monitor may associate the network security policies that may result in a large number of disk write operations with the SSD wear-out problem as the source or possible cause of the problem. In another example, the device health monitor may determine the network security policies at issue were newly incorporated before the wear-out problem arose and further evaluate which of the new network security policies may result in a large number of disk write operations as mentioned above. If one or more newly incorporated network security policies include or cause disk write operations, then the device health monitor may associate the network security policies with the SSD wear-out problem as the cause or possible cause of the problem. In another example, when a high temperature of the CPU of the network security appliance is detected, the device health monitor may analyze network security policies of the network security appliance to find out which ones may cause excessive CPU operations. For example, security policies that bind multiple security services, such as one or more of IPS, antivirus, data leak prevention, and deep scanning, to network traffic between any source IP address and any destination IP address are likely to result in a large number of CPU operations. The device health monitor may associate such network security policies with the CPU high temperature problem as the cause or possible cause of the problem. In a further example, the device health monitor may track the updates to the software environment of the network security appliance before the CPU problem. If the network operating system of the network security appliance was updated to a new version or installed a particular patch within a predetermined or configurable time before the issue arose, the device health monitor may associate the new version of the network operating system or the patch with the CPU high temperature problem as the cause or possible cause of the problem. If some network security policies are changed or added before detection of the CPU high temperature problem, the device health monitor may associate these network security policies with the problem as the cause of the problem.

At block 407, the device health monitor may inform the administrator of the network security appliance of the abnormal usage and the possible cause(s) in the environment information. The administrator may further check if abnormal usage actually resulted from the possible cause(s) and take appropriate actions to address the problem.

Returning to block 404, if the abnormal usage is a common problem among multiple network security appliances, the process branches to block 408 of FIG. 4B.

At block 408, the device health monitor may retrieve the environment information of the multiple network security appliances that have the common problem from a device registration database. The environment information may include hardware configuration information and software environment information, including, but not limited to versions of network operating systems and network security policies running on the network security appliances.

At block 409, the device health monitor may determine common software and/or hardware configurations of the multiple network security appliances that have the common problem. In one example, the device health monitor may check if the network security appliances have the same version of network operating system or have common network security policies. The device health monitor may also check if the network security appliances are from the same manufacturer, the same model or the same production batch. In another example, the device health monitor may check if the network security appliances have the same updates of software or hardware configurations. For example, the device health monitor may check if the network security appliances have the same updates to the network security policies or whether the same patches were applied to the network operating systems just before the common problem occurred.

At block 410, the device health monitor attempts to identify the cause or potential cause of the abnormal usage from the common environment information of the network security appliances. In particular, the device health monitor may determine common software configurations resulted in a common hardware problem experienced by the network security appliances. For example, when a common SSD wear-out problem is detected, the device health monitor may analyze the common network security policies of the network security appliances to find out which ones may result in a large number of disk operations. The device health monitor may associate the common network security policies of the network security appliances with the common SSD wear-out problem as the cause or possible cause of the problem. In another example, the device health monitor may track the network security policies that were newly incorporated to the multiple network security appliances and further determine which of the newly network security policies may result in a large number of disk write operations. If one or more of the common network security policies of the network security appliances are associated with a large number of disk write operations, then the device health monitor may associate the common network security policies with the SSD wear-out problem as the cause or possible cause of the problem. In another example, when a high CPU temperature is a common problem of a number of network security appliances, the device health monitor may analyze the common network security policies of the network security appliances to identify which ones may result in a large number of CPU operations. For example, security policies that bind multiple security services, such as IPS, antivirus, data leak prevention, and deep scanning, to network traffic between any source IP address and any destination IP address may result in a large number of CPU operations. The device health monitor may associate the common network security policies that may result in a large number of CPU operations with the CPU high temperature problem as the cause or possible cause of the problem. In a further example, the device health monitor may track updates to the software environments of the network security appliances before the CPU problem. If the software configurations of the network security appliances have common updates or patches, the device health monitor may associate the common updates or patches with the CPU high temperature problem as the cause or possible cause of the problem.

At block 411, the device health monitor may inform the administrator of the network security appliances of the abnormal usage and its cause or possible cause in the environment information. The administrator may further check if the abnormal usage actually resulted from the cause suggested by the health monitor and take appropriate actions to address the problem.

Figure 5:
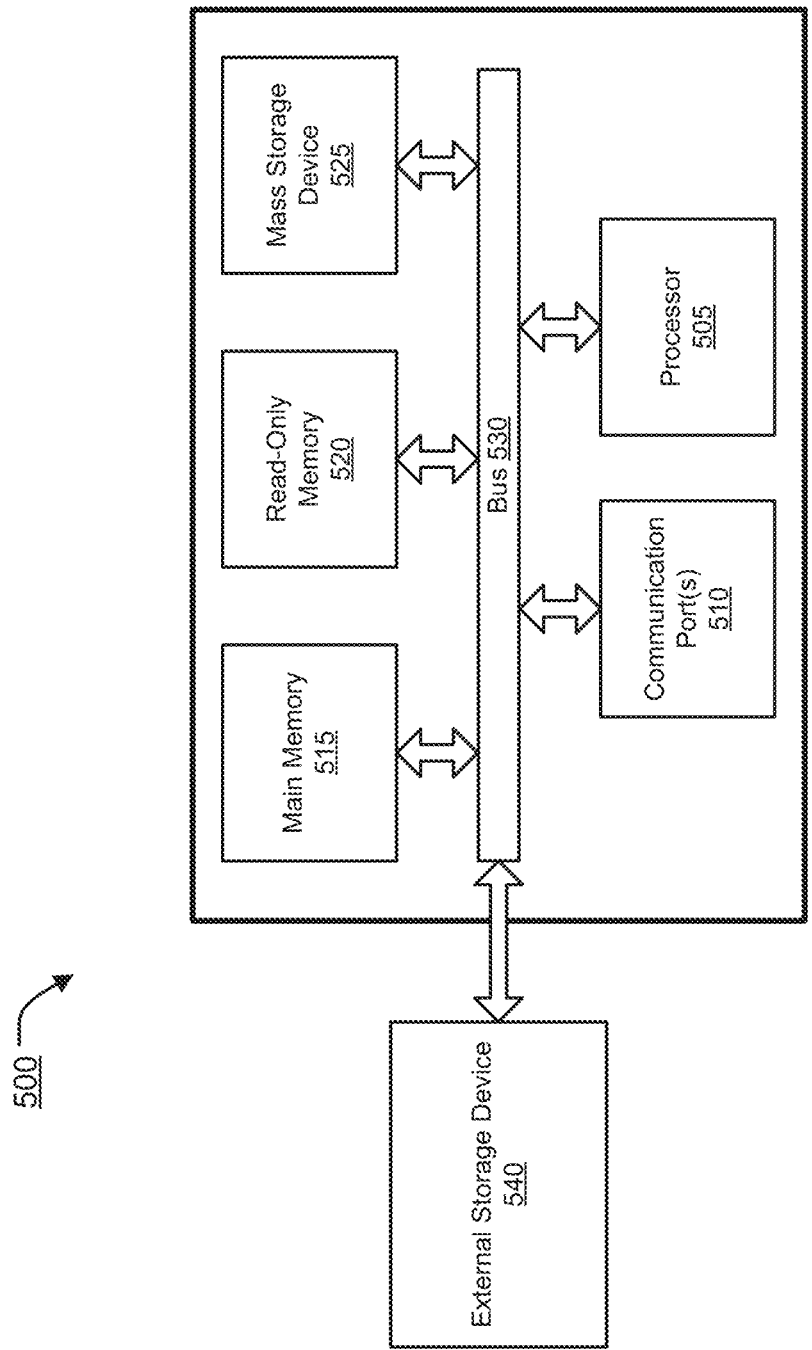
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of a network appliance (e.g., network security appliance 120), a server (e.g., network device health monitor 140) or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising: for each network security device of a plurality of network security devices: receiving, by a network device health monitor, a usage log for the network security device over a network connection, wherein the usage log contains information regarding a write count to a solid state disk (SSD) of the network security device during a particular timeframe; wherein the usage log contains information regarding a utilization of a central processing unit (CPU) of the network security device during a particular timeframe; and determining, by the network device health monitor, based on an analysis of the usage log for the network security device whether an abnormal usage issue has occurred within the network security device, including comparing the write count to an SSD write count threshold and including comparing the utilization of the CPU to a CPU utilization threshold; determining, by the network device health monitor, whether the abnormal usage issue is common across multiple network security devices of the plurality of network security devices and if so, for each network security device of the multiple network security devices: retrieving, by the network device health monitor, environment information of the network security device, wherein the environment information includes a network security policy configuration of the network security device; and identifying, by the network device health monitor, a potential cause of the abnormal usage issue by detecting a potential defect within the environment information and associating the abnormal usage issue with potential defect within the environment information, wherein said detecting a potential defect includes: when the write count exceeds the SSD write count threshold, determining whether there exists a security policy in the network security policy configuration that triggers logging of network traffic between a plurality of source Internet Protocol (IP) addresses and a plurality of destination IP addresses by analyzing the network security policy configuration; and when the utilization of the CPU exceeds the CPU utilization threshold, determining whether there exists a security policy in the network security policy configuration that binds multiple security services between the plurality of source Internet Protocol (IP) addresses and the plurality of destination IP addresses by analyzing the network security policy configuration; and causing, by the network device health monitor, an administrator of the network device to be notified regarding the abnormal usage issue and the potential defect.

2. The method of claim 1, further comprising collecting, by the network device health monitor, the environment information of a network security device of the plurality of network security devices during registration of the network security device with the network device health monitor.

3. The method of claim 1, further comprising collecting, by the network device health monitor, the environment information of a network security device of the plurality of network security devices responsive to an update to the environment information of the network security device.

4. The method of claim 1, wherein the common abnormal usage issue of the network device comprises an abnormal hardware usage issue.

5. The method of claim 4, wherein the abnormal hardware usage issue comprises one or more of: excessive disk write operations; high-CPU usage over an extended time period; high kernel CPU usage; and high network usage.

6. The method of claim 1, wherein the common abnormal usage issue comprises an abnormal software usage issue.

7. The method of claim 6, wherein the abnormal software usage issue comprises one or more of: a daemon crash; a kernel crash; a memory leak; and memory usage in conserve mode.

8. The method of claim 1, wherein the environment information comprises software environment information, including one or more of: a version of an operating system running within the network security device; a software update log; and a network security policy configuration.

9. The method of claim 1, wherein the plurality of source IP addresses comprises any source IP address and wherein the plurality of destination IP addresses comprises any destination IP address.

10. A computer system comprising: non-transitory storage device having embodied therein instructions representing a device health monitoring application; and one or more processors coupled to the non-transitory storage device and operable to execute the health monitoring application to perform a method comprising: for each network security device of a plurality of network security devices: receiving a usage log for the network security device over a network connection, wherein the usage log contains information regarding a write count to a solid state disk (SSD) of the network security device during a particular timeframe; wherein the usage log contains information regarding a utilization of a central processing unit (CPU) of the network security device during a particular timeframe; and determining based on an analysis of the usage log for the network security device whether an abnormal usage issue has occurred within the network security device, including comparing the write count to an SSD write count threshold; including comparing the utilization of the CPU to a CPU utilization threshold; determining whether the abnormal usage issue is common across multiple network security devices of the plurality of network security devices and if so, for each network security device of the multiple network security devices: retrieving environment information of the network security device, wherein the environment information includes a network security policy configuration of the network security device; and identifying a potential cause of the abnormal usage issue by detecting a potential defect within the environment information and associating the abnormal usage issue with potential defect within the environment information, wherein said detecting a potential defect includes: when the write count exceeds the SSD write count threshold, determining whether there exists a security policy in the network security policy configuration that triggers logging of network traffic between a plurality of source Internet Protocol (IP) addresses and a plurality of destination IP addresses by analyzing the network security policy configuration; and when the utilization of the CPU exceeds the CPU utilization threshold, determining whether there exists a security policy in the network security policy configuration that binds multiple security services between the plurality of source Internet Protocol (IP) addresses and the plurality of destination IP addresses by analyzing the network security policy configuration; and causing an administrator of the network device to be notified regarding the abnormal usage issue and the potential defect.

11. The computer system of claim 10, wherein the method further comprises collecting the environment information of a network security device of the plurality of network security devices during registration of the network security device with the device health monitoring application.

12. The computer system of claim 10, wherein the method further comprises collecting the environment information of a network security device of the plurality of network security devices responsive to an update to the environment information of the network security device.

13. The computer system of claim 10, wherein the common abnormal usage issue comprises an abnormal hardware usage issue.

14. The computer system of claim 13, wherein the abnormal hardware usage issue comprises one or more of: excessive disk write operations; high-CPU usage over an extended time period; high kernel CPU usage; and high network usage.

15. The computer system of claim 10, wherein the common abnormal usage issue comprises an abnormal software usage issue.

16. The computer system of claim 15, wherein the abnormal software usage issue comprises one or more of: a daemon crash; a kernel crash; a memory leak; and memory usage in conserve mode.

17. The computer system of claim 10, wherein the environment information comprises software environment information, including one or more of: a version of an operating system running within the network security device; a software update log; and a network security policy configuration.

18. The computer system of claim 10, wherein the plurality of source IP addresses comprises any source IP address and wherein the plurality of destination IP addresses comprises any destination IP address.

* * * * *